US012064838B2

(12) United States Patent
Becker et al.

(10) Patent No.: US 12,064,838 B2
(45) Date of Patent: Aug. 20, 2024

(54) HOLDING DEVICE FOR HOLDING A STUD AND JOINING HEAD

(71) Applicant: NEWFREY LLC, New Britain, CT (US)

(72) Inventors: Adrian Becker, Giessen (DE); Christoph Eisenberg, Giessen (DE); Jochen Hain, Giessen (DE); Harald Knetsch, Giessen (DE); Nicolas Nab, Giessen (DE)

(73) Assignee: NEWFREY LLC, New Britain, CT (US)

( * ) Notice: Subject to any disclaimer, the term of this patent is extended or adjusted under 35 U.S.C. 154(b) by 1497 days.

(21) Appl. No.: 16/276,751

(22) Filed: Feb. 15, 2019

(65) Prior Publication Data
US 2019/0255666 A1 Aug. 22, 2019

(30) Foreign Application Priority Data

Feb. 16, 2018 (EP) .................................... 18157084
Mar. 28, 2018 (EP) .................................... 18164460

(51) Int. Cl.
*B23P 19/00* (2006.01)
*B23K 9/20* (2006.01)
(Continued)

(52) U.S. Cl.
CPC ............ *B23P 19/006* (2013.01); *B23K 9/201* (2013.01); *B23K 9/202* (2013.01); *B23K 9/206* (2013.01); *B23K 11/0053* (2013.01); *B23K 37/04* (2013.01)

(58) Field of Classification Search
CPC ...... B23K 9/206; B23K 11/0053; B23K 9/20; B23K 9/202; Y10T 279/1249
(Continued)

(56) References Cited

U.S. PATENT DOCUMENTS 4,201,904 A * 5/1980 Weidman ............... B23K 9/202
219/98
4,306,137 A * 12/1981 Shoup .................... B23K 9/202
219/98
(Continued)

FOREIGN PATENT DOCUMENTS

AT 390219 B * 4/1990
FR 2684909 A1 * 6/1993 ............. B23K 9/164
(Continued)

OTHER PUBLICATIONS

Office Action Dated Dec. 5, 2022 cited in corresponding Japanese Patent Application No. 2019-023165.

*Primary Examiner* — Helena Kosanovic
*Assistant Examiner* — Damon Joel David Alfaro
(74) *Attorney, Agent, or Firm* — Michael P. Leary

(57) ABSTRACT

A device for holding a stud with a radially flange and an axial shank. The holding device comprising a collet including a clamping section and a hollow insertion section defining an insertion axis such that the stud can be inserted via the insertion section to the clamping section. The holding device further comprising a tubular securing sleeve located radially inward of and concentric with the insertion section. A clearance is defined between a bottom end of the securing sleeve and a top end of the clamping section and is adapted to releasably receive the stud flange. A first air flow channel in a first direction is adapted to blow feed the stud into the collet; and a second airflow channel oriented in a second different direction is adapted to maintain the stud shank substantially in line with the insertion axis.

20 Claims, 3 Drawing Sheets

(51) Int. Cl.
  *B23K 11/00* (2006.01)
  *B23K 37/04* (2006.01)

(58) Field of Classification Search
  USPC .................................................. 219/98, 99
  See application file for complete search history.

(56) References Cited

U.S. PATENT DOCUMENTS

| | | | | |
|---|---|---|---|---|
| 4,442,336 | A * | 4/1984 | Shoup | B23K 9/202 |
| | | | | 219/98 |
| 4,804,820 | A * | 2/1989 | Shoup | B23K 9/201 |
| | | | | 219/98 |
| 5,938,946 | A * | 8/1999 | Kurz | B23K 9/20 |
| | | | | 219/98 |
| 6,015,962 | A * | 1/2000 | Wiessler | B23K 9/206 |
| | | | | 219/98 |
| 6,559,406 | B2 * | 5/2003 | Stepetic | B23K 11/0053 |
| | | | | 219/98 |
| 7,071,440 | B2 * | 7/2006 | Sakoda | B23K 9/206 |
| | | | | 219/98 |
| 8,434,768 | B2 * | 5/2013 | Schug | B23K 9/206 |
| | | | | 219/98 |
| 8,533,922 | B2 * | 9/2013 | Hain | B65G 51/02 |
| | | | | 81/463 |
| 8,793,855 | B2 * | 8/2014 | Hain | B65G 51/02 |
| | | | | 81/53.2 |
| 2002/0153357 | A1 * | 10/2002 | Kurz | B23K 9/20 |
| | | | | 219/98 |
| 2003/0052093 | A1 * | 3/2003 | Stepetic | B23K 11/0053 |
| | | | | 219/98 |
| 2004/0245220 | A1 * | 12/2004 | Mauer | B23K 9/206 |
| | | | | 219/98 |

FOREIGN PATENT DOCUMENTS

| | | | |
|---|---|---|---|
| JP | S62155963 | U * | 10/1987 |
| JP | S62155963 | U | 10/1987 |
| JP | 2012528721 | A | 11/2012 |

* cited by examiner

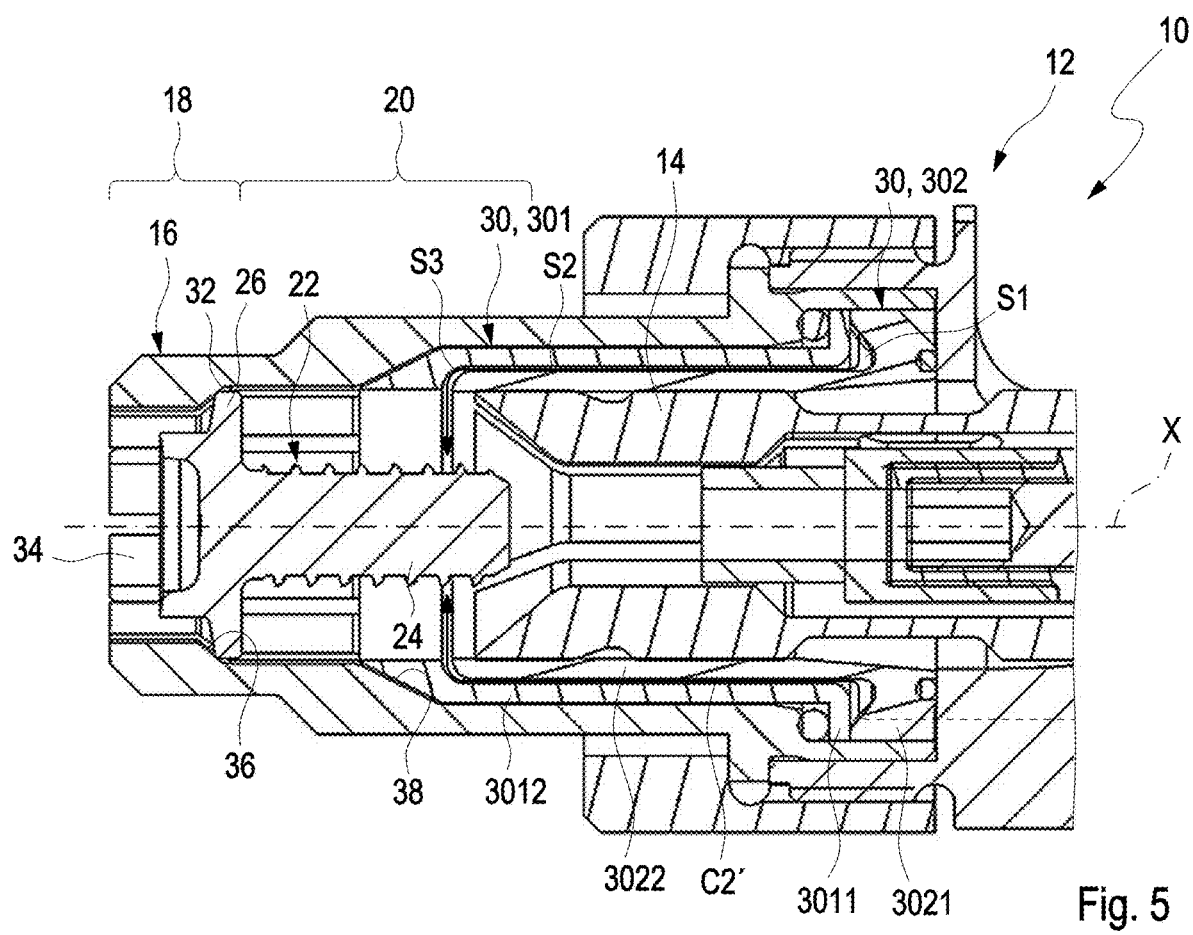
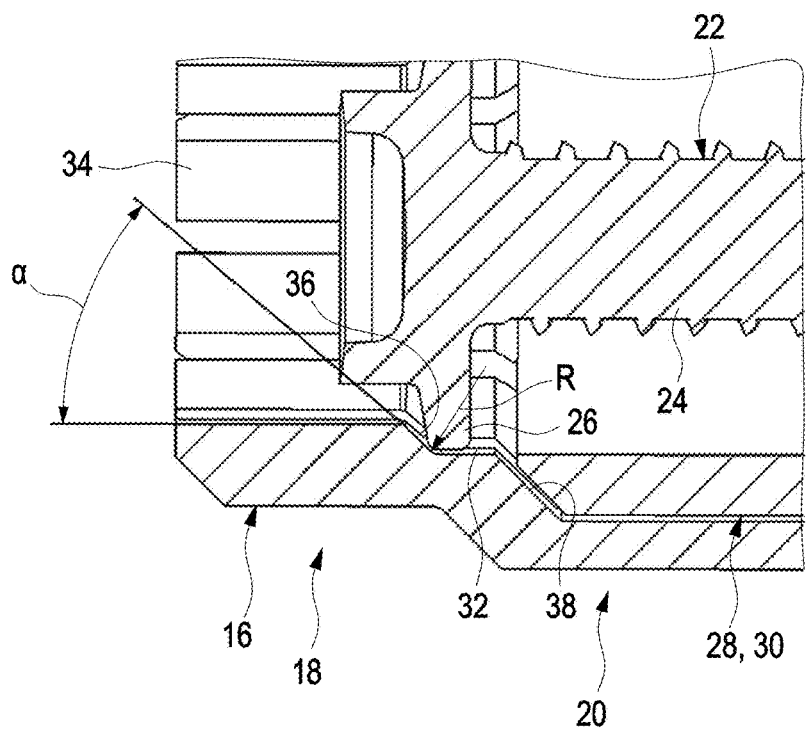

HOLDING DEVICE FOR HOLDING A STUD AND JOINING HEAD

CROSS-REFERENCE TO RELATED APPLICATION

This application claims priority from European Patent Application No. 18157084.7, filed on Feb. 16, 2018 and European Patent Application No. 18164460.0, filed on Mar. 28, 2018, the disclosures of which are incorporated herein by reference.

BACKGROUND OF THE INVENTION

The present invention relates to a holding device for studs which have a radially projecting flange section and a joining head comprising a holding device and a shank-clamping device which can be inserted into the holding device and is designed in order to accommodate the shank section of a stud in a securing position.

In the field of joining technology, it is known to join studs to the surface of a workpiece. This includes "stud welding", in which a stud is welded to the surface of a workpiece. Alternative joining techniques include, for example, the adhesive bonding of a stud to the surface of a workpiece.

Such processes are frequently carried out in an automated manner, for example in the automotive industry, where a multiplicity of such studs are joined to the vehicle body in order to provide anchors for fastening means, paneling, etc. The automated joining of studs to workpieces as a rule includes the provision of a joining head on a robot. The joining head is in this case connected to a supply unit which provides, for example, the electric welding current and other control signals. Furthermore, it is preferred to feed the studs to the joining head in an automated manner. As a rule, this is effected by compressed air through feed tubes. For high cycle times, it is appropriate in this case to feed the studs from the rear, as it were, into a holding device of the joining head. The holding device serves to shift the stud into a defined ready position, starting from which a joining process can be initiated.

The diameter of the feed passages is as a rule slightly larger than the diameter of the flange section in order to make it possible to transport the stud therein with an easy motion. In the holding device, too, the inside diameter of the insertion section is as a rule slightly larger than the outside diameter of the flange section. This may result in a stud fed to the holding device coming into an oblique position in the holding direction and first having to be oriented (centered) again with a welding axis before the stud can be transferred into the ready position. In some situations, it may be the case that this centering does not succeed, the result of which is that the fed stud then has to be ejected from the holding device. In the process, the stud falls downward in an uncontrolled manner, either onto the floor or also, for example in automobile construction, into the body. The ejected studs then lie distributed on the floor and are swept up and thrown away. Studs left lying in a body may subsequently lead to disturbing noises during driving.

Document EP1495828 discloses a holding device for studs which have a radially projecting flange section, comprising a collet component which has a clamping section and a hollow insertion section, it being possible for a stud to be inserted via the insertion section to the clamping section, and the clamping section being designed in order to exert a radially inwardly directed clamping force for clamping the stud in place, a securing device, past which a flange section of the stud can be directed, being arranged on the insertion section and being designed with respect to the clamping section in such a way that a flange section which is directed past the securing device is mounted in a secured manner in a securing position between the securing device and the clamping section.

The holding device disclosed in EP1495828 has a securing device in the form of a collet element arranged inside a collet cover. The collet element has a plurality of axially extending arms which can be expanded radially relative to one another.

A need exists to further improve the existing holding device to increase the reliability of the feeding.

Document EP2321086 discloses a holding device for holding a stud which includes a radially projecting flange in a securing position, the holding device comprising: a collet component including a hollow tubular insertion section defining an insertion axis, and a clamping section operable to exert a radially inwardly directed clamping force for clamping the stud; a securing device arranged on the insertion section and including a securing sleeve formed of plurality of separate securing-sleeve sections and radially movable relative to one another; and a clearance space is defined between a bottom end of the securing-sleeve sections and a top end of the clamping section, and the clearance space is operable for releasably holding a flange of a stud in the securing position. The flange of the stud is securely held in a clearance space between the securing sleeve and the bottom end of the collet.

Document DE29617208U1 also discloses a holding device for holding a stud having a radially projecting flange and a shank in a securing position, comprising a collet component including a hollow tubular insertion section and a securing device located outside the insertion section.

SUMMARY OF THE INVENTION

Different further embodiments and implementations of a stud holder have been developed and tested by the applicant in order to provide a holding device which allows a reliable holding of the stud.

For example, the applicant developed and tested a holding device adapted to pre-stop the stud in the collet with a securing sleeve made of plastic material and inserted in the collet component. The securing sleeve may have a plurality of elastic tongues which allow to reduce the diameter of the channel adapted to receive the studs. The elastic tongues comprise an end portion (also called nose) and the stud can be pre-stopped by the nose. A shank clamping device can then be used to straighten the stud and drive the stud until the collet component end beyond the nose.

The Applicant also tried to regulate the air flow provided to drive the stud in the collet, for example with a securing sleeve having a plurality of slots. The securing sleeve may be provided with elastic tongues which at least partially define an aperture in which the studs are driven. Additional elastic latches may extend within the aperture of the securing sleeve.

Even if such holding devices may be satisfactory is some cases, the need still exists to reliably hold the stud in the holding device. The object of the present invention is to specify an improved holding device which is easy to manufacture and reliable. More particularly, the object of the present invention is to provide a holding device which can reliable maintain a stud in a centred position without the support of a shank-clamping device.

Accordingly the present invention provides a holding device for holding a stud which includes a radially projecting flange, comprising: a collet component having a clamping section and a hollow insertion section defining an insertion axis and adapted to receive a stud such that the stud can be inserted via the insertion section to the clamping section, the clamping section being adapted to exert a radially inwardly directed clamping force for clamping the stud; a securing device arranged on the insertion section and comprising a securing sleeve; a clearance space defined between a bottom end of the securing sleeve and a top end of the clamping section, the clearance space being adapted to releasably hold a flange of a stud in a securing position; a first air flow channel adapted to feed the stud in the collet, the first air flow channel being oriented in a first direction; characterized in that the holding device further comprises at least a second airflow channel oriented in a second direction different from the first direction, the second air flow channel being adapted to maintain the stud in a non-oblique position.

The two air flow channels allow to actively maintain a stud in a secured position or ready position, such that the stud will not fall in an uncontrolled manner. The maintaining of the stud with a second air flow channel allows tolerance compensation. Such holding device can be reliably used with short studs having an enlarged flange. The second air flow channel enable to provide a targeted air flow directed to the flange of the stud and evenly distributed on a surface of the flange of the stud such that the stud is maintained in position by the air flow. More particularly the second air flow is directed to an inside surface of the flange. Thus, the stud is actively maintained in position. The dimensions of the clearance space may thus allow an axial play for the flange. A disassembly of the holding device is easy to perform.

In a particular embodiment, the collet component includes a slotted cylindrical front portion forming the clamping section.

In a particular embodiment, a plurality of air flow channels are provided.

In a particular embodiment, a first tapered section is provided between the clamping section and the insertion section, wherein the first tapered section comprises a first inner surface, wherein the clamping section comprises a clamping inner surface, and wherein the first inner surface is inclined compared with the clamping inner surface at an angle of between 30 degrees and 55 degrees.

In a particular embodiment, the first inner surface is inclined compared with the clamping inner surface at an angle of 40 degrees.

In a particular embodiment, a first tapered section is provided between the clamping section and the insertion section, wherein the first tapered section comprises a first inner surface, and wherein the first inner surface comprises a radius of curvature, the radius of curvature allowing a correct positioning of the stud. More particularly, a spherical joint can thus be provided and the flange of the stud can pivot without any obstruction to reach a non-oblique position. None acute angle limiting the rotational motion of the flange is provided.

In a particular embodiment, a second tapered section is provided between the clamping section and the insertion section, the second tapered section comprising a second inner surface being inclined compared with an inner surface of the insertion section, and wherein the second tapered section extends between the first tapered section and the insertion section. Thus, two diameter decreasing portions are provided.

In a particular embodiment, the securing sleeve comprises a slot adapted to form the second air flow channel. For example, the second air flow channel is partly or completely defined by the slot arranged in the securing sleeve.

In a particular embodiment, the slot is an annular slot and comprises an inlet and an outlet adapted to discharge air inside the securing sleeve.

In a particular embodiment, the securing sleeve comprises a plurality of openings adapted to receive air from the second air flow channel. For instance, the securing sleeve comprises at least three openings.

In some embodiments, the slot extends in cross section along a second channel direction, the second channel direction being inclined compared to the direction of the insertion axis at an angle of between 3 degrees and 90 degrees. The direction of the flow allows to maintain the stud in a non-oblique position.

In a particular embodiment, the securing sleeve is a one-piece element. Thus, the securing sleeve is easy to assemble. In such case, the securing sleeve may be provided with constructive segments in order to allow the second air flow channel to be at least partly annular.

In a particular embodiment, the securing sleeve comprises a first component and a second component, and wherein the second air flow channel extends between the first and second components.

In a particular embodiment, the first component comprises a first cylindrical body, wherein the second component comprises a second cylindrical body extending in the first cylindrical body, and wherein a gap is provided between the first and second cylindrical body, such that the gap forms a portion of the second air flow channel.

In a particular embodiment, the first component has a radially projecting first flange, wherein the second component has a radially projecting second flange, wherein the first flange is arranged facing the second flange such that a space is provided between the first and second flanges, and the second air flow channel partly extends in the space.

In a particular embodiment, the first component comprises a first cylindrical body, wherein the second component comprises a second cylindrical body extending in the first cylindrical body, and wherein a gap is provided between the first and second cylindrical body, such that the air of the second air flow channel can flow in the gap toward the clamping section.

In a particular embodiment, the first component and/or the second component comprise(s) a sealing element.

The present invention is also directed to a joining head comprising a holding device as previously described and a shank-clamping device which can be inserted into the holding device and is designed in order to accommodate the shank section of a stud in a securing position, the shank-clamping device being arranged movable in the holding device.

BRIEF DESCRIPTION OF THE DRAWINGS

Other characteristics and advantages of the invention will readily appear from the following description of embodiments, provided as non-limitative examples, in reference to the accompanying drawings.

FIG. 5 shows a cross-section of a joining head with the holding device and the stud of FIG. 4 and a shank-clamping device.

FIG. 6 is a detailed view of a portion of the collet component and the stud of FIG. 1 or of FIG. 4.

On the different figures, the same reference signs designate identical or similar elements.

DETAILED DESCRIPTION OF THE PREFERRED EMBODIMENTS

Figure 3:
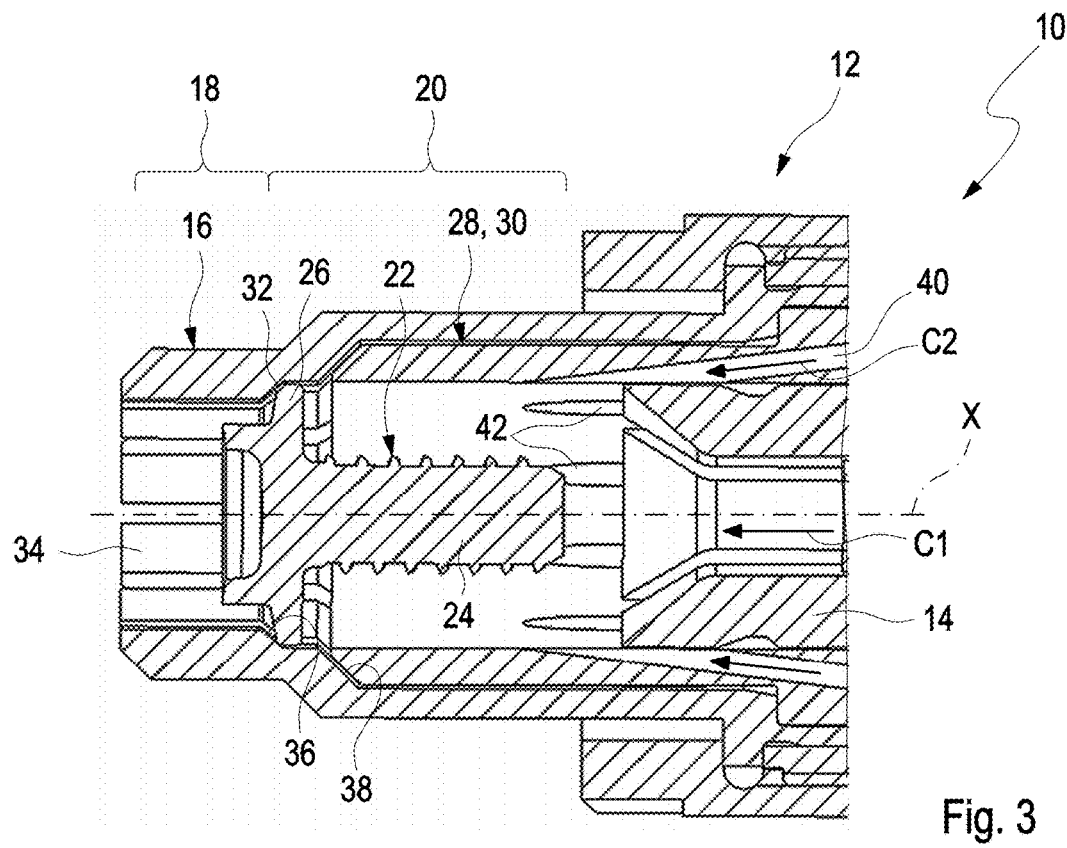
FIG. 3 shows a cross-section of a joining head with the holding device and the stud of FIG. 1 and a shank-clamping device.

FIG. 3 and FIG. 5 show a joining head 10 comprising a holding device 12 and a shank-clamping device 14. Such joining head 10 can be used for example in a joining system such as a stud welding system. Generally, stud welding systems comprise a robot having multi-jointed arms. A welding head is secured to the end of a processing arm of the robot. The welding head is connected via an electrical supply and via a stud feed to a supply unit.

The supply unit typically contains power electronics for providing a welding current, which is fed to the welding head. Furthermore, the supply unit typically contains a control device, by means of which the robot can also be activated, to be precise via a robot control. Furthermore, the supply unit contains a stud supply, from which studs are fed separately to the stud feed.

The welding head contains a feed passage which is connected to the stud feed and via which a respective stud can be directed into the welding head. The stud fed to the welding head is to be welded to a workpiece, for example a metal sheet, by means of the welding system.

Alternatively, however, the joining system with the joining head may also be designed to adhesively bond or braze the stud to the workpiece.

As represented in the figures, the holding device 12 of the joining head 10 comprises a collet component 16. The collet component 16 has a clamping section 18 and an insertion section 20. The collet component 16 define an insertion axis X. The collet component 16 is adapted to receive a stud 22 such that the stud 22 can be inserted via the insertion section 20 to the clamping section 18, the clamping section 18 being adapted to exert a radially inwardly directed clamping force for clamping the stud 22.

The stud 22 has a shank section 24, which can be provided, for example, with an external thread. Furthermore, the stud 22 has a flange section 26 which projects radially relative to the shank section and which may be of polygonal or circular design, for example, at its outer circumference. Finally, the stud has a welding section which is to be connected to the workpiece.

The holding device 12 is designed to shift the stud fed via a feed passage into a ready position, in which the stud has a defined position with respect to the joining head, the position being adapted to perform the joining process described above.

More particularly, the holding device 12 is adapted to secure the stud 22 against an oblique position.

A securing device 28 is arranged on the insertion section (and more particularly in the insertion section). The securing device 28 comprises a securing sleeve 30. The securing sleeve 30 is hollow and comprises a bottom end.

A clearance space 32 is defined between the bottom end of the securing sleeve 30 and a top end of the clamping section 18, the clearance space 32 being adapted to releasably hold a flange of a stud 22 in a securing position (also called ready position). The dimension of the clearance space 32 is such that the flange of the stud has sufficient room for maneuver in the insertion (or axial) direction.

Figure 2:
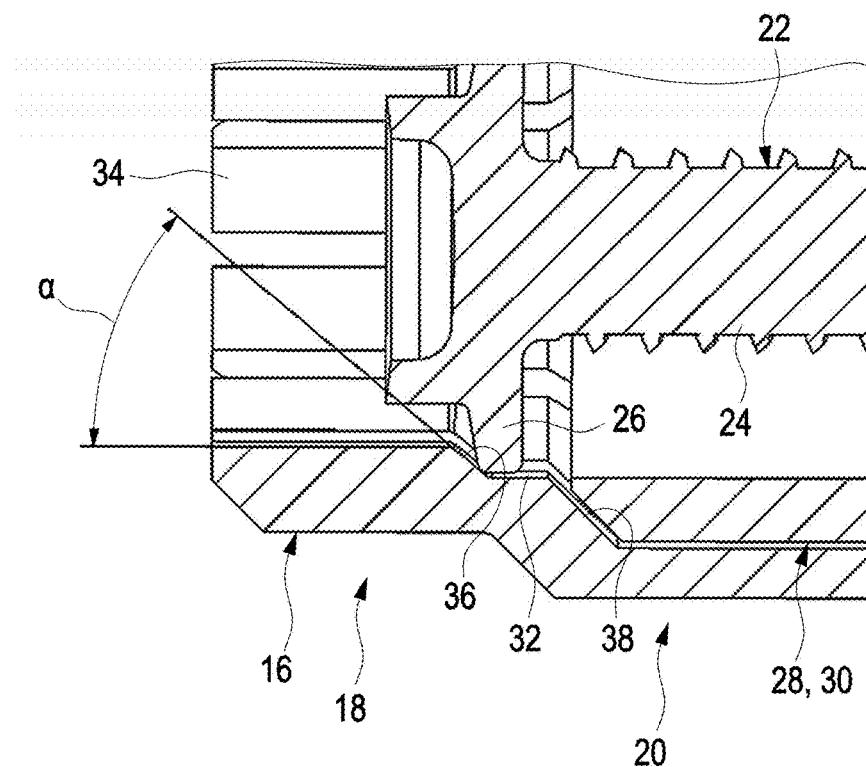
FIG. 2 is a detailed view of a portion of the collet component and the stud of FIG. 1.

As illustrated in FIG. 2, the collet component 16 includes a slotted cylindrical front portion 34 forming the clamping section 18. A first tapered section 36 is provided between the clamping section and the insertion section. The first tapered section 36 is inclined with regard to the clamping section 18. More particularly, the first tapered section comprises a first inner surface. The clamping section 18 comprises an inner clamping surface and the first inner surface is inclined compared with the clamping inner surface at an angle of between 30 degrees and 55 degrees. In particular, the first inner surface is inclined compared with the clamping inner surface at an angle of about 40 degrees. Such angle is advantageous to provide a reliable ready position of the stud.

The shape of the collet component 16, and more particularly the first tapered section facilitates the centring of the stud. Indeed, the flange 26 of the stud can contact the first tapered section and a shape cooperation can be provided for a correct positioning of the stud.

In an alternative or supplemental embodiment, illustrated in FIG. 6, the first inner surface may have a curvature R which corresponds to the radius of curvature of the outer circumference of the flange. This allows the stud 22 to pivot, thus avoiding the stud to get stick.

As shown in FIG. 2 and FIG. 6, a second tapered section 38 may be provided between the clamping section and the insertion section. The second tapered section comprises a second inner surface inclined compared with an inner surface of the insertion section. The second tapered section extends between the first tapered section and the insertion section. The second tapered section 38 may form an abutment surface for the securing sleeve.

The studs 22 are fed in the joining head 10 with compressed air. A first air flow channel C1, oriented in a first direction is thus provided. The first direction is for example sensibly oriented parallel to the insertion axis.

A second air flow channel C2, C2' oriented in a second direction, different from the first direction, is also provided. The second air flow channel C2, C2' is more particularly arranged in the securing sleeve 30, as illustrated in FIG. 1, FIG. 3, FIG. 4 and FIG. 5.

Figure 1:
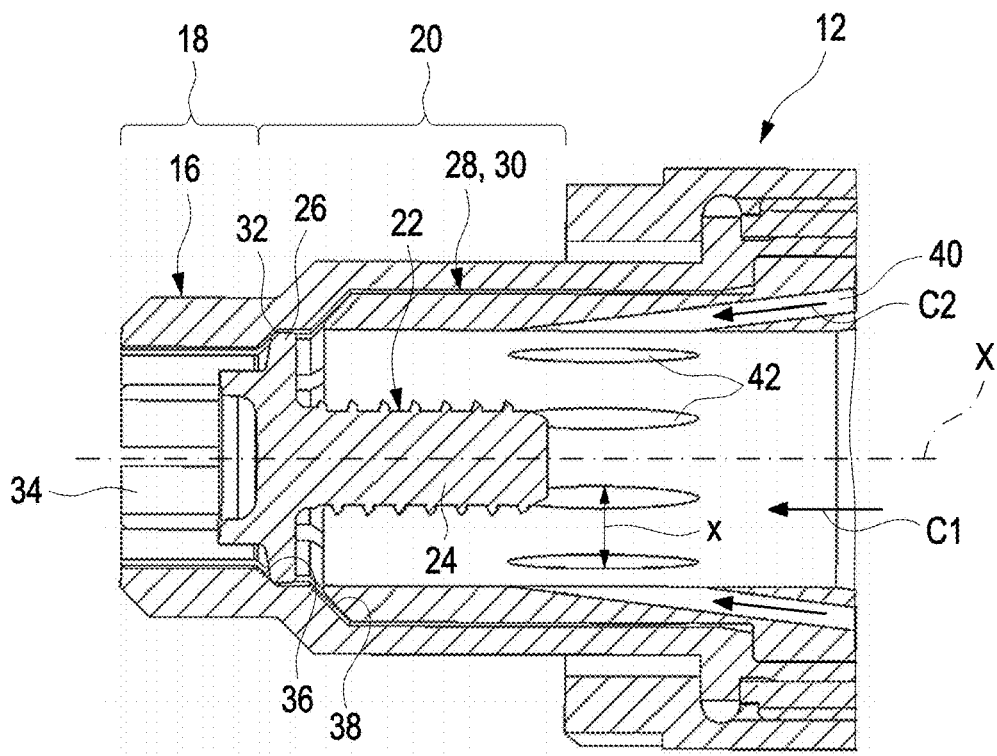
FIG. 1 shows a cross-section of a holding device according to the invention having a collet component, a securing device and a clearance space defined between a bottom end of the securing sleeve and a top end of the clamping section, with a stud arranged in the holding device in a ready position, in which the shank axis of the stud is coincident with an insertion axis.

As represented in FIG. 1 and FIG. 3, the securing sleeve 30 according to a first embodiment is a one-piece part. The securing sleeve 30 comprises a slot 40. The slot 40 is more particularly an annular slot. The slot 40 is adapted to receive or to form the second air flow channel C2, C2'. The slot comprises an inlet to receive compressed air and an outlet to discharge the compressed air. The outlet is open toward the clearance space. The outlet is annular such that the air flow coming from the second air flow channel and directed to the flange of the stud is annular.

The slot extends in cross-section along a second channel direction, the second channel direction being inclined compared to the direction of the insertion axis at an angle of between 5 degrees and 80 degrees, more particularly between 10 and 45 degrees.

The securing sleeve 30 further comprises a plurality of openings adapted to receive air from the second airflow channel. The openings 42 are for example evenly distributed on the securing sleeve 30. The opening 42 extends along a longitudinal axis. The distance x between two openings is smaller than the diameter of the flange of the stud.

The shank-clamping device 14 is movably arranged in the holding device, such that the shank-clamping device 14 is adapted to grip the shank of the stud 22 and to be removed to avoid obstructing the aperture to feed a further stud after the first stud has been joined to the workpiece. The plurality of openings 42 ensures that the stud is maintained in a centered position (or in the ready position) even when the shank-clamping device partially obstructs the air flow coming from the second air flow channel. More particularly FIG. 3 shows the shank-clamping device just before its movement toward the shank of the stud to grip said shank. The stud 22 is maintained in a centred position with its shank being oriented along the insertion position through the air coming from the second air flow channel. The shank-clamping device 14 can thus reliably grip the shank.

The plurality of opening can be arranged, as illustrated in FIG. 1 and FIG. 3 at a non-zero distance from the bottom end of the securing sleeve or can be provided in the vicinity of said bottom end.

Figure 4:
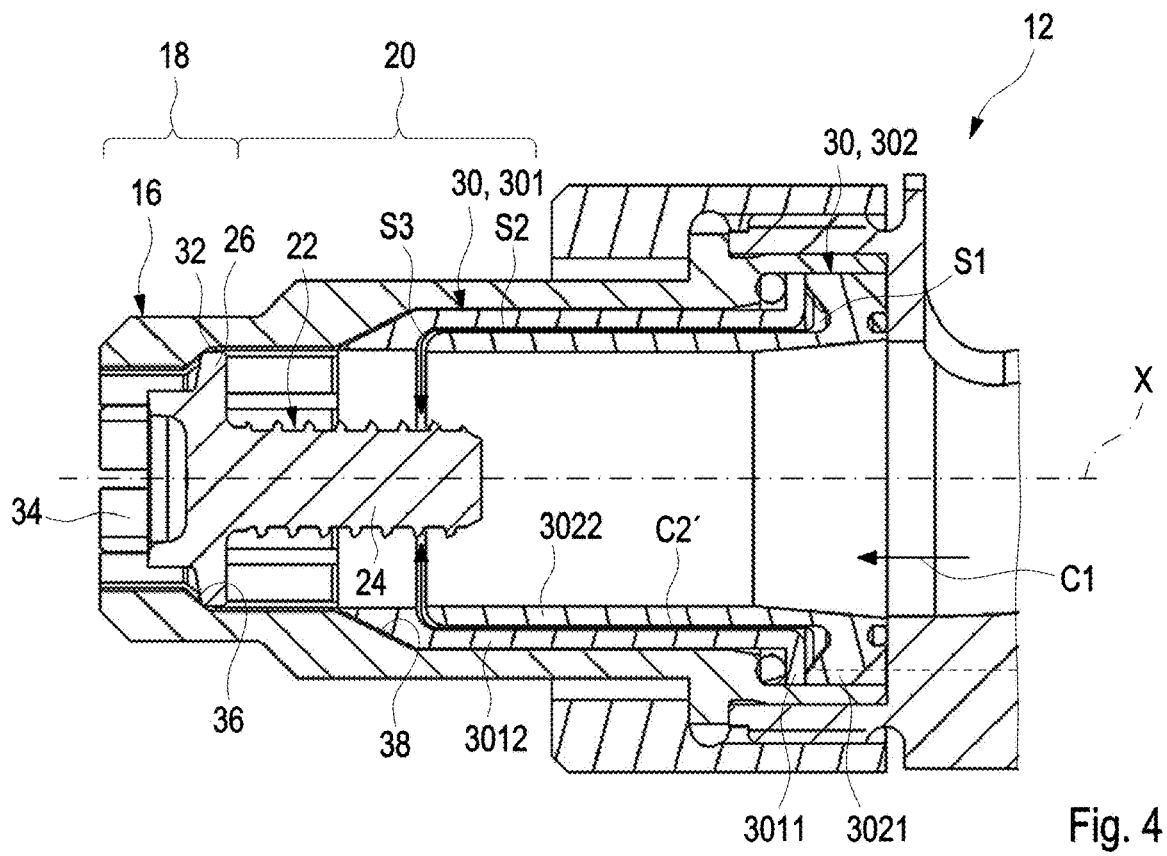
FIG. 4 shows a cross-section of a holding device according to a second embodiment of the invention and a stud arranged in the holding device.

In a second embodiment, illustrated in FIGS. 4 and 5, the securing sleeve 30 comprises a first component 301 and a second component 302. The second air flow channel C2' extends at least partly between the first component and second component.

More particularly, as represented in FIG. 4 and FIG. 5, the first component has a radially projecting first flange 3011. The first component has also a first cylindrical body 3012, the first flange extending at a free end of the first cylindrical body. The first component is centred with regard to the insertion axis.

The second component 302 has a radially projecting second flange 3021. The second component has also a second cylindrical body 3022, the second flange extending at a free end of the second cylindrical body. The second component is centred with regard to the insertion axis X.

The second component 302 is arranged within the first component 301. The first flange 3011 is arranged facing the second flange 3021 and a space S1 is provided between the first and second flanges such that the space can form a portion of the second air flow channel. The first and second components 301, 302 can be fixedly secured to each other.

The first flange and/or the second flange may form sealing elements or sealing rings.

A gap S2 is provided between the first and second cylindrical body 3012, 3022, such that the gap S2 can form a portion of the second air flow channel.

The bottom end of the second component is such that the air flow arriving from the second air flow channel is directed in a direction perpendicular or sensibly perpendicular to the insertion direction, as represented in FIG. 5. More particularly, the bottom end of the second component is arranged such that an annular gap S3 is formed between said bottom end of the second component and the first component. Said annular gap form a portion of the second air flow channel and allows the air coming from the second air flow channel to be oriented in a direction sensibly perpendicular to the insertion direction.

The annular gap S3 or outlet in the first or second embodiment of the securing sleeve 30 could also be replaced by a plurality of nozzles evenly distributed around the circumference of the securing sleeve.

When the shank-clamping device 14 moves toward the stud 22, the air flow coming from the first air flow channel C1 is interrupted. Thus, only air flow coming from the second air flow channel C2, C2' is applied to the stud. This air flow coming from the second air flow channel maintain the stud in the clearance space in a ready or centred position. The air flow from the second air flow channel C2, C2' is maintained until a front end of the shank-clamping device abuts against an abutment surface of the holding device.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A holding device for holding a stud which includes a radially projecting flange and a shank defining a stud axis, the holding device comprising:
   a collet component defining an insertion axis and including a clamping section and an insertion section and a first tapered section located between the clamping section and the insertion section and adapted to receive the stud such that the stud can be inserted via the insertion section to the clamping section, the clamping section adapted to exert a radially inwardly directed clamping force for clamping the stud;
   a securing device substantially tubular and located radially inward of and concentric with the insertion section and comprising a securing sleeve axially fixed relative to the collet component;
   a clearance space defined between a bottom end of the securing sleeve and a top end of the clamping section, the clearance space adapted to releasably receive the flange of the stud;
   a first air flow channel adapted to blow feed the stud into the collet component, the first air flow channel oriented in a first direction;
   a second airflow channel oriented in a second direction different from the first direction, the second air flow channel adapted to maintain the stud axis substantially in line with the insertion axis; and
   wherein the securing sleeve includes a first component and a second component at least partially located radially inward of the first component, and wherein the second air flow channel is partially defined between the first and second components.

2. A holding device according to claim 1, wherein the collet component includes a slotted cylindrical front portion forming the clamping section.

3. A holding device according to claim 1, wherein the first tapered section includes a first inner surface, and the clamping section includes a clamping inner surface, and the first inner surface is inclined to the clamping inner surface at an angle (α) of between 30 degrees and 55 degrees.

4. A holding device according to claim 3, wherein the first inner surface is inclined to the clamping inner surface at an angle (α) of 40 degrees.

5. A holding device according to claim 3, wherein the collet component includes a second tapered section located between the clamping section and the insertion section, the second tapered section including a second inner surface inclined to an inner surface of the insertion section, and the second tapered section is located between the first tapered section and the insertion section.

6. A holding device according to claim 1, wherein the first tapered section includes a first inner surface, and the first inner surface includes a radius of curvature, the radius of curvature allowing a correct positioning of the stud.

7. A holding device according to claim 1, wherein the securing sleeve includes a slot, and the slot forms the second airflow channel.

8. A holding device according to claim 7, wherein the slot is an annular slot and includes an inlet and an outlet adapted to discharge an air inside the securing sleeve.

9. A holding device according to claim 1, wherein the first component has a radially projecting first flange, wherein the second component has a radially projecting second flange, wherein the first flange is arranged axially facing the second flange such that a space is partially defined between the first and second flanges, and the space forms a portion of the second air flow channel.

10. A holding device according to claim 1, wherein the first component includes a first cylindrical body, and the second component includes a second cylindrical body extending coaxially inside the first cylindrical body, and a radial gap is partially defined between the first and second cylindrical body, such that the gap forms a portion of the second air flow channel.

11. A holding device according to claim 1, wherein one of the first component and the second component includes a sealing element.

12. A holding device for holding a stud which includes a radially projecting flange and a shank defining a stud axis, the holding device comprising:
 a collet component defining an insertion axis and including a clamping section and an insertion section and a first tapered section located between the clamping section and the insertion section and adapted to receive the stud such that the stud can be inserted via the insertion section to the clamping section, the clamping section adapted to exert a radially inwardly directed clamping force for clamping the stud;
 a securing device substantially tubular and located radially inward of and concentric with the insertion section and comprising a securing sleeve axially fixed relative to the collet component;
 a clearance space defined between a bottom end of the securing sleeve and a top end of the clamping section, the clearance space adapted to releasably receive the flange of the stud;
 a first air flow channel adapted to blow feed the stud into the collet component, the first air flow channel oriented in a first direction;
 a second airflow channel oriented in a second direction different from the first direction, the second air flow channel adapted to maintain the stud axis substantially in line with the insertion axis; and
 wherein the securing sleeve includes a slot, and the slot forms the second airflow channel, and wherein the slot is an annular slot and includes an inlet and an outlet adapted to discharge an air inside the securing sleeve.

13. A holding device according to claim 12, wherein the collet component includes a slotted cylindrical front portion forming the clamping section.

14. A holding device according to claim 12, wherein the first tapered section includes a first inner surface, and the clamping section includes a clamping inner surface, and the first inner surface is inclined to the clamping inner surface at an angle ($\alpha$) of between 30 degrees and 55 degrees.

15. A holding device according to claim 14, wherein the first inner surface is inclined to the clamping inner surface at an angle ($\alpha$) of 40 degrees.

16. A holding device according to claim 14, wherein the collet component includes a second tapered section located between the clamping section and the insertion section, the second tapered section including a second inner surface inclined to an inner surface of the insertion section, and the second tapered section is located between the first tapered section and the insertion section.

17. A holding device according to claim 12, wherein the first tapered section includes a first inner surface, and the first inner surface includes a radius of curvature, the radius of curvature allowing a correct positioning of the stud.

18. A holding device according to claim 12, wherein the securing sleeve includes a first component and a second component at least partially located radially inward of the first component, and wherein the second air flow channel is partially defined between the first and second components.

19. A holding device according to claim 18, wherein the first component has a radially projecting first flange, wherein the second component has a radially projecting second flange, wherein the first flange is arranged axially facing the second flange such that a space is partially defined between the first and second flanges, and the space forms a portion of the second air flow channel.

20. A holding device according to claim 18, wherein the first component includes a first cylindrical body, and the second component includes a second cylindrical body extending coaxially inside the first cylindrical body, and a radial gap is partially defined between the first and second cylindrical body, such that the gap forms a portion of the second air flow channel.

* * * * *